(12) United States Patent
Cho et al.

(10) Patent No.: US 7,928,047 B2
(45) Date of Patent: Apr. 19, 2011

(54) POWDER DETERGENT GRANULE CONTAINING ACIDIC WATER-SOLUBLE POLYMER

(75) Inventors: Min-Seok Cho, Daejeon (KR);
Young-Kee Oh, Daejeon (KR);
Kee-Heon Cho, Daejeon (KR);
Hyun-Chang Kim, Daejeon (KR);
Sang-Woon Kwak, Daejeon (KR)

(73) Assignee: LG Household & Health Care Ltd. (KR)

( * ) Notice: Subject to any disclaimer, the term of this patent is extended or adjusted under 35 U.S.C. 154(b) by 263 days.

(21) Appl. No.: 12/033,503

(22) Filed: Feb. 19, 2008

(65) Prior Publication Data

US 2008/0200362 A1   Aug. 21, 2008

Related U.S. Application Data

(60) Provisional application No. 60/894,275, filed on Mar. 12, 2007.

(30) Foreign Application Priority Data

Feb. 21, 2007 (KR) .................. 10-2007-0017623
Sep. 17, 2007 (KR) .................. 10-2007-0094173

(51) Int. Cl.
*C11D 17/06* (2006.01)
*C11D 3/37* (2006.01)
*C11D 3/10* (2006.01)
*C11D 3/065* (2006.01)

(52) U.S. Cl. ........ 510/276; 510/351; 510/356; 510/361; 510/444; 510/475; 510/476; 510/509

(58) Field of Classification Search .................. 510/361, 510/475, 477, 509, 276, 351, 356, 444, 476
See application file for complete search history.

(56) References Cited

U.S. PATENT DOCUMENTS

| | | | | |
|---|---|---|---|---|
| 4,450,013 A | * | 5/1984 | Hirsch et al. | 524/424 |
| 5,126,069 A | * | 6/1992 | Kud et al. | 510/476 |
| 5,494,488 A | * | 2/1996 | Arnoldi et al. | 510/292 |
| 5,716,923 A | | 2/1998 | MacBeath | |
| 5,756,444 A | * | 5/1998 | Walters et al. | 510/299 |
| 5,830,956 A | * | 11/1998 | Stockhausen et al. | 526/318.2 |
| 5,977,053 A | | 11/1999 | Groth et al. | |
| 7,186,677 B2 | * | 3/2007 | Rahse et al. | 510/444 |
| 2005/0187132 A1 | * | 8/2005 | Blank et al. | 510/446 |

FOREIGN PATENT DOCUMENTS

| | | |
|---|---|---|
| EP | 0 352 135 | 1/1990 |
| WO | WO 97/12955 | 4/1997 |
| WO | WO 00/18873 | 4/2000 |
| WO | WO 00/32738 | 6/2000 |

* cited by examiner

*Primary Examiner* — Lorna M Douyon

(74) *Attorney, Agent, or Firm* — Stroock & Stroock & Lavan LLP

(57) ABSTRACT

The present invention relates to powder detergent granules that are substantially free of a water-insoluble component such as zeolite or silica, a method for manufacturing the powder detergent granules and a copolymer having various properties useful as a detergent component. The powder detergent granules of the present invention are substantially free of a water-insoluble component, and thus exhibit good solubility and washing performance (stain removal performance) in cold water, do not leave residue after laundry, and reduce the likelihood of a caking phenomenon during manufacture and storage. And, the powder detergent granules of the present invention are substantially free of zeolite or silica that absorbs a liquid component, but are capable of accommodating a considerable amount of liquid surfactant. Further, a copolymer comprising acrylic acid monomer unit and 2-acrylamido-2-methylpropane sulfonic acid monomer unit, an acidic water-soluble polymer of the present invention, is useful as a detergent component in various aspects.

20 Claims, 1 Drawing Sheet

POWDER DETERGENT GRANULE CONTAINING ACIDIC WATER-SOLUBLE POLYMER

This application claims the benefit of U.S. Provisional Application No. 60/894,275, filed Mar. 12, 2007, and foreign priority of Republic of Korean Application No. 10-2007-0017623, filed Feb. 21, 2007 and Republic of Korean Application No. 10-2007-0094173, filed Sep. 17, 2007.

TECHNICAL FIELD

The present invention relates to powder detergent granules exhibiting good solubility in cold water, not leaving residue after laundry and having improved caking phenomenon prevention, manufacturing method thereof, and a new polymer useful as a detergent component.

BACKGROUND ART

Generally, a powder detergent has better washing effect in soft water than in hard water containing more magnesium and calcium ions, and by this reason, the powder detergent contains a hard-water softener, for example zeolite.

The conventional water softener, zeolite is insoluble in water, and after laundry, zeolite builds up in clothes and requires considerable time to bind ions, thereby retarding a softening effect, and thus the calcium ions remaining during laundry are bonded to carbonate ions that are ionized from an alkali builder to form calcium carbonate, which builds up in a washing tank of a washing machine, a heating coil and clothes. To overcome this problem, zeolite is used in the form of fine granules. However, the problem is not completely solved.

DISCLOSURE

Technical Problem

Therefore, it is an object of the present invention to provide powder detergent granules that have good washing capability without use of a water-insoluble component such as zeolite or silica, and have good solubility in cold water and improved functions of soil redeposition prevention and water softening, and to provide a method for manufacturing the powder detergent granules simply and effectively.

It is another object of the present invention to provide water-soluble powder detergent granules capable of preventing a caking phenomenon and accommodating a considerable amount of liquid detergent component without a substantial use of a water-insoluble component such as zeolite or silica, and to provide a method for manufacturing the water-soluble powder detergent granules.

It is yet another object of the present invention to provide a new copolymer having useful properties in aspect of metal ion binding, soil removal and water solubility, and to provide a new use of the polymer as a detergent component.

Technical Solution

In order to achieve the above-mentioned objects, the present invention provides powder detergent granules formed by mixing 0.1 to 15 parts by weight of an acidic water-soluble polymer with 10 to 70 parts by weight of an alkali builder to carry out a neutralization reaction, and preferably the acidic water-soluble polymer is a polymer comprising at least one unit selected from the group consisting of a monomer unit containing a carboxylic acid group, a monomer unit containing a sulfonic acid group and a monomer unit containing a phosphoric acid group, more preferably a copolymer comprising a monomer unit containing a carboxylic acid group and a monomer unit containing a sulfonic acid group.

And, the present invention provides a method for manufacturing powder detergent granules that are dried using heat generated by a neutralization reaction between an acid water-soluble polymer and an alkali builder, comprising (S1) preparing an acidic water-soluble polymer, most preferably a copolymer comprising a monomer unit containing a carboxylic acid group and a monomer unit containing a sulfonic acid group, and an alkali builder; (S2) putting 0.1 to 15 parts by weight of the acidic water-soluble polymer and 10 to 70 parts by weight of the alkali builder into a mixer; and (S3) uniformly mixing the components of the step (S2) put into the mixer.

According to the present invention, the method for manufacturing powder detergent granules may eliminate the need of or reduce usage of a counter-current flow spray dryer or a steam spray mixer that is complicated and expensive and is used after the neutralization reaction, thereby resulting in a simple and economical manufacturing process.

According to the present invention, the powder detergent granules are manufactured by the neutralization reaction between the acidic water-soluble polymer and the alkali builder. The present invention is based on the principle that the neutralization reaction generates heat for drying the powder detergent granules and gas for creating pores in the powder detergent granules, thereby the manufacturing method of the present invention can improve solubility of the powder detergent granules.

And, the present invention provides a copolymer comprising acrylic acid monomer unit and 2-acrylamido-2-methylpropane sulfonic acid monomer unit, which has good effect of metal ion binding, in particular calcium ion and magnesium ion, and provides a detergent composition comprising the copolymer. Preferably, a weight ratio of the acrylic acid monomer unit to 2-acrylamido-2-methylpropane sulfonic acid monomer unit is 95:5 to 80:20, more preferably 95:5 to 90:10.

Also, the present invention provides a metal ion binding composition comprising the above-mentioned copolymer, preferably a calcium ion binding composition.

Further, the present invention provides a hard-water softening composition comprising the above-mentioned copolymer.

BEST MODE

Figure 1:
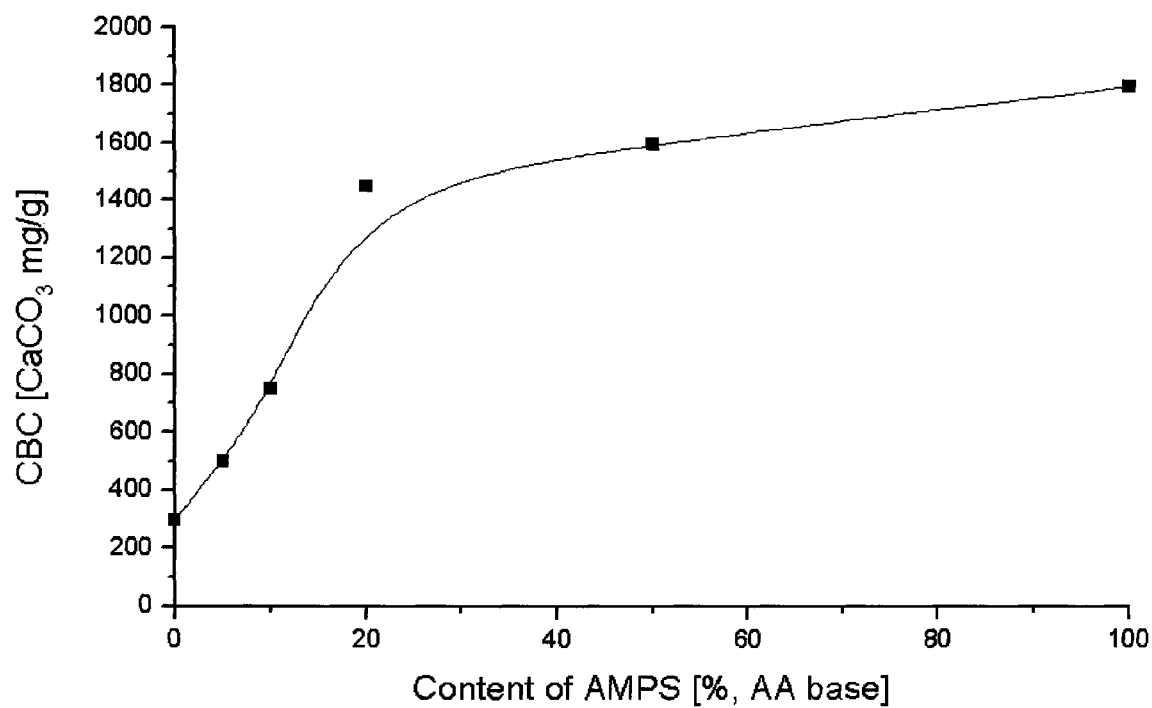
FIG. 1 is a graph showing results of change of calcium binding capacity according to a weight ratio of acrylic acid monomer unit and 2-acrylamido-2-methylpropane sulfonic acid monomer unit in a copolymer of Chemistry Figure 3 of the present invention.

Hereinafter, powder detergent granules, a method for manufacturing the powder detergent granules and an inventive copolymer useful as a detergent component according to the present invention will be described in detail.

The powder detergent granules that are substantially free of a water-insoluble component such as zeolite or silica, comprise 0.1 to 15 parts by weight of an acidic water-soluble polymer.

The meaning that the water-insoluble component such as zeolite or silica is 'substantially excluded' or 'substantially does not exist' is herein construed as that the water-insoluble component such as zeolite or silica is completely not used in the manufacture of the powder detergent granules or is used 10 weight % or less based on a total weight of the powder detergent granules, preferably 5 weight % or less, more preferably 1 weight % or less.

The acidic water-soluble polymer may be a homopolymer or a copolymer comprising at least one monomer unit selected from the group consisting of a monomer unit containing a carboxylic acid group, a monomer unit containing a sulfonic acid group and a monomer unit containing a phosphoric acid group, and the copolymer may be various types of copolymers, for example a random copolymer, an alternating copolymer, a block copolymer or a graft copolymer.

According to the present invention, the copolymer includes a heteropolymer or a terpolymer that consists of two or three kinds of monomers, respectively.

And, according to the present invention, the powder detergent granules may comprise at least two kinds of acidic water-soluble polymers, and a monomer of each of the acidic water-soluble polymers may simultaneously contain at least two acid groups selected from the group consisting of a carboxylic acid group, a sulfonic acid group and a phosphoric acid group.

And, according to the present invention, in the case that the acidic water-soluble polymer is a copolymer comprising at least two different units selected from the group consisting of a monomer unit containing a carboxylic acid group, a monomer unit containing a sulfonic acid group and a monomer unit containing a phosphoric acid group, the powder detergent granules exhibit better effects of washing and caking phenomenon prevention. In particular, in the case that the acidic water-soluble polymer is a copolymer comprising a monomer unit containing a carboxylic acid group and a monomer unit containing a sulfonic acid group, the powder detergent granules have faster solubility in cold water, better washing capability and more effective caking phenomenon prevention.

In greater detail, the acidic water-soluble polymer according to the present invention may be a polymer comprising at least one monomer unit represented by the following Chemistry Figure 1 or 2, more specifically a homopolymer or a copolymer, however the present invention is not limited thereto.

[Chemistry FIG. 1]

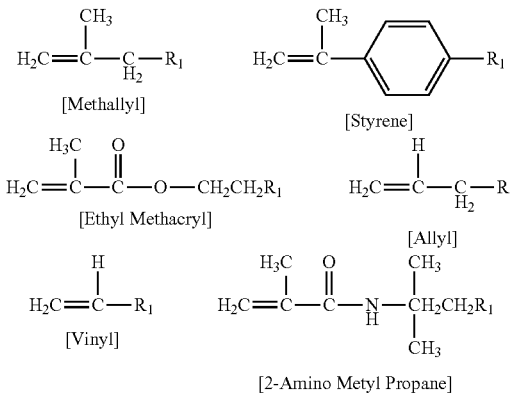

-continued

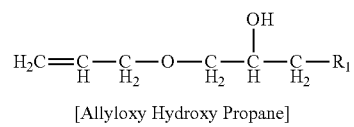

[Allyloxy Hydroxy Propane]

where $R_1$ each is independently a carboxylic acid group, a sulfonic acid group ($SO_3^-H^+$), a phosphoric acid group ($PO_4^-H^+$), a phosphonic acid group ($PO_3^-H^+$), or salts thereof.

[Chemistry FIG. 2]

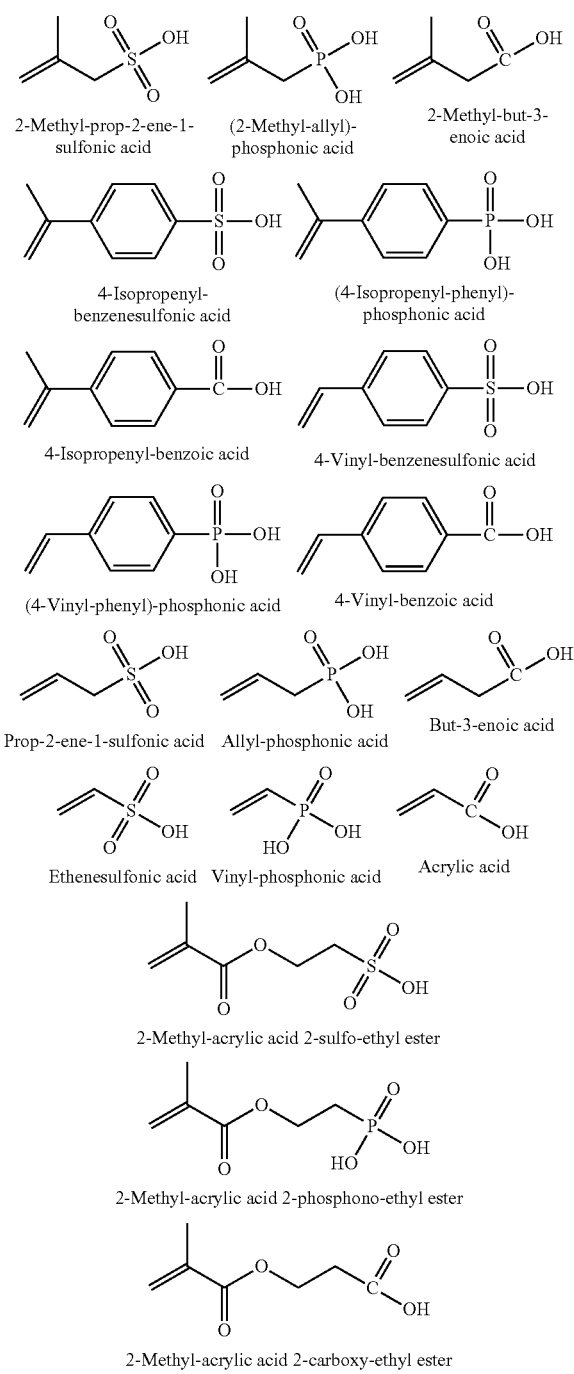

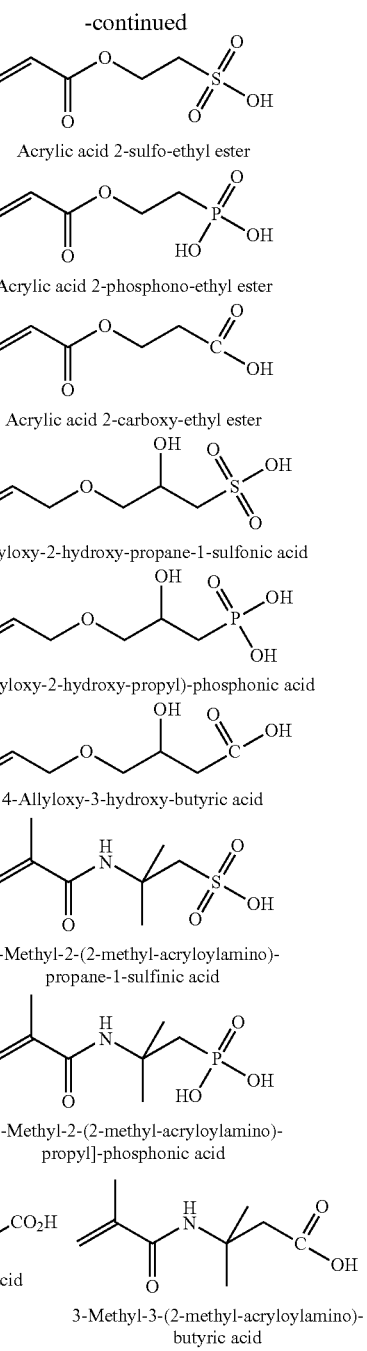

Acrylic acid 2-sulfo-ethyl ester

Acrylic acid 2-phosphono-ethyl ester

Acrylic acid 2-carboxy-ethyl ester

3-Allyloxy-2-hydroxy-propane-1-sulfonic acid (3-Allyloxy-2-hydroxy-propyl)-phosphonic acid 4-Allyloxy-3-hydroxy-butyric acid 2-Methyl-2-(2-methyl-acryloylamino)-propane-1-sulfinic acid

[2-Methyl-2-(2-methyl-acryloylamino)-propyl]-phosphonic acid

Itaconic acid

3-Methyl-3-(2-methyl-acryloylamino)-butyric acid

As concrete examples, the acidic water-soluble polymer may be alpha-hydroxylic acid polymer, tetramethylene-1,2-dicarboxylic acid polymer, 4-methoxytetramethylene-1,2-dicarboxylic acid polymer, styrene sulfonic acid polymer, styrene phosphoric acid polymer, styrene polymer, or combinations thereof, and may be a copolymer comprising at least two monomer units selected from the group consisting of alpha-hydroxylic acid, tetramethylene-1,2-dicarboxylic acid, 4-methoxytetramethylene-1,2-dicarboxylic acid, styrene sulfonic acid, styrene phosphoric acid and styrene, or combinations thereof.

In the above homopolymer or copolymer, a sulfonic acid or carboxylic acid is connected to a side chain of a polymer in the shape of an acid and reacted with a base material, so that a neutralization reaction occurs to form a polymer salt, thereby manufacturing powder detergent granules without use of zeolite. And, as moisture is removed in the shape of a polymer, the shape is maintained due to physical properties of the polymer, and thus pores created by gas generated in the neutralization reaction can be maintained.

Preferably, a pH of 0.1% (w/w) aqueous solution of the acidic water-soluble polymer is 1 to 3. And, as described above, to maintain the pores created by gas generated in the neutralization reaction, preferably the acidic water-soluble polymer has a specific average molecular weight range. That is, in the case that the acidic water-soluble polymer has an average molecular weight of 3,000 to 60,000, it is easier to manufacture the powder detergent granules. In the case that the acidic water-soluble polymer has an average molecular weight of 10,000 to 40,000, it is much easier to manufacture the powder detergent granules.

And, in the case that the acidic water-soluble polymer is a copolymer comprising a monomer unit containing a carboxylic acid group and a monomer unit containing a sulfonic acid group, a ratio of the carboxylic acid group to the sulfonic acid group is 99:1 to 50:50, preferably 95:5 to 50:50, more preferably 95:5 to 80:20, most preferably 95:5 to 90:10. In the case that a ratio of the sulfonic acid group is low, a solubility promoting effect may be insignificant, and in the case that a ratio of the sulfonic acid group is high, the whole color of the polymer may become deep brown.

And, the present invention is based on the fact that, a copolymer comprising acrylic acid monomer unit and 2-acrylamido-2-methylpropane sulfonic acid monomer unit, one of the acidic water-soluble polymer, is very useful as a detergent component. The above-mentioned copolymer is superior to other kinds of acidic water-soluble polymers in aspect of metal ion binding, soil removal, soil redeposition prevention, solubility in water, easiness of manufacturing powder detergent granules and phase stability in mixing with other detergent component.

According to the present invention, the above-mentioned copolymer has better effect of metal ion binding, in particular, calcium and magnesium ions than other kinds of acidic water-soluble polymers. General water contains a lot of calcium ions and magnesium ions that should be excluded to prevent reduction of washing capability, and in this regard, the above-mentioned copolymer of the present invention is useful for the powder detergent granules. And, the powder detergent granules are dried by heat generated from the neutralization reaction between the water-soluble acidic polymer and the alkali builder, and in this regard, the above-mentioned copolymer of the present invention is very useful in manufacturing the powder detergent granules.

For example, in calcium binding capacity evaluation using $CaCO_3$ [2 g of a sample is dissolved in 100 ml of a distilled water, 10 ml of 2% $NaCO_3$ is added, pH is adjusted to 11 using 0.1N—NaOH, and then the solution is titrated with 4.4% $Ca(AC)_2H_2O$ solution. End point is a time that opaque turbidity emergence is maintained (it does not disappear even under a strong agitation)], it is found that the copolymer comprising acrylic acid monomer unit and 2-acrylamido-2-methylpropane sulfonic acid monomer unit has higher metal ion binding capability about 2.1 or 1.6 times than an acrylic acid homopolymer or a copolymer comprising acrylic acid monomer unit and styrenesulfonic acid monomer unit. And, in dissolution time evaluation using 5° C. of water, it is found that the copolymer comprising acrylic acid monomer unit and 2-acrylamido-2-methylpropane sulfonic acid monomer unit is dissolved much faster than an acrylic acid homopolymer or a copolymer comprising an acrylic acid monomer unit and a styrenesulfonic acid monomer unit.

In consideration of various properties as a detergent component, preferably the copolymer comprising acrylic acid monomer unit and 2-acrylamido-2-methylpropane sulfonic acid monomer unit has a weight ratio (A:B) of acrylic acid monomer unit (A) to 2-acrylamido-2-methylpropane sulfonic acid monomer unit (B) of 95:5 to 80:20, more preferably 95:5 to 90:10. And, to exhibit optimum effect as a detergent component, preferably the copolymer comprising acrylic acid monomer unit and 2-acrylamido-2-methylpropane sulfonic acid monomer unit has an average molecular weight of 2,000 to 100,000, more preferably 3,000 to 5,000, or 10,000 to 30,000 or 50,000 to 90,000.

In greater detail, as shown in FIG. 1, as a weight ratio of 2-acrylamido-2-methylpropane sulfonic acid monomer unit increases, the calcium binding capacity increased, and preferably a weight ratio of acrylic acid monomer unit to 2-acrylamido-2-methylpropane sulfonic acid monomer unit is 95:5 to 80:20. In case the weight ratio of 2-acrylamido-2-methylpropane sulfonic acid monomer unit is higher than the above-mentioned weight ratio, it was not economical because the calcium binding capacity in proportion to manufacturing costs was low, and in case the weight ratio of 2-acrylamido-2-methylpropane sulfonic acid monomer unit is lower than the above-mentioned weight ratio, the calcium binding capacity was somewhat poor.

And, as a detergent component useful in manufacturing the powder detergent granules, preferably the copolymer comprising acrylic acid monomer unit and 2-acrylamido-2-methylpropane sulfonic acid monomer unit has a pH of 0.1 to 3 when measured as 50% aqueous solution according to KSM0011 method and a viscosity of 300 to 2,000 cP at 25° C. when measured according to KSM3825 (#B Viscometer RVT (#3/50)) method.

A preferred example of the copolymer comprising acrylic acid monomer unit and 2-acrylamido-2-methylpropane sulfonic acid monomer unit according to the present invention may be represented by the following Chemistry Figure 3, and may be manufactured using a radical polymerization method that is a general polymerization method of an acrylic acid, which is well known in the art. At this time, for easy application to a laundry detergent, viscosity of the copolymer should be controlled, and the conventional viscosity control using an organic solvent such as isopropyl alcohol (IPA) has an odor problem, however the present invention controls the viscosity by control of polymerization temperature, not by use of the organic solvent, thereby preventing the odor problem.

[Chemistry FIG. 3]

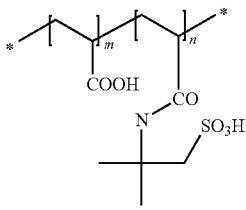

Therefore, the present invention provides the powder detergent granules comprising the copolymer comprising acrylic acid monomer unit and 2-acrylamido-2-methylpropane sulfonic acid monomer unit, and preferably a water-insoluble component is used 5 weight % or less based on a total weight of the powder detergent granules.

Also, the present invention provides a metal ion binding composition comprising the above-mentioned copolymer, in particular a calcium ion binding composition.

Further, the present invention provides a hard-water softening composition comprising the above-mentioned copolymer having the above-mentioned properties.

And, the powder detergent granules of the present invention comprise 10 to 70 parts by weight of an alkali builder as a component that brings about a neutralization reaction with the acidic water-soluble polymer. In consideration of the objects of the present inventions, preferably the alkali builder is a water-soluble alkali builder, and the water-soluble alkali builder may be sodium carbonate (soda ash), sodium bicarbonate (sodium hydrogen carbonate), sodium sulfate, sodium hydroxide (caustic soda), or combinations thereof.

The meaning, 'water-soluble' is herein construed as that a retention ratio of a water-insoluble material is 0.5 weight % or less when measured by the following measuring method. The water-solubility measuring method is described as follows: 3.5 g of a sample to be evaluated is added into 300 ml beaker and 150 ml of a distilled water is putted into the beaker. Next, the beaker is sealed and bathed at 70° C. for 3 hours. Subsequently, the beaker is agitated in a mechanical agitator for about 1 hour. Filtration is performed using a filter paper of measured weight, the remaining material on the filter paper is dried at 100° C., and weight of the dried material is measured. At this time, a pore size of the filter paper is 0.45 μm. And, weight of a water-insoluble component remaining on the filter paper is calculated as % based on weight of the sample.

Generally, the alkali builder can prevent an increase of pH of the powder detergent granules by a proper combination, which inhibits dye transfer to clothes that may occur during a high-temperature laundry, and in the present invention, the alkali builder brings about a neutralization reaction with the acidic water-soluble polymer as well. In particular, density of the powder detergent granules may be different depending on content of the alkali builder, and thus it is possible to control the density of the powder detergent granules by controlling the content of the alkali builder properly. That is, pores are created by moisture and gas such as carbon dioxide that are generated by a neutralization reaction between the above-mentioned acidic water-soluble polymer as an acid component and the alkali builder as a base component, and thus the powder detergent granules may be manufactured with various densities by controlling the pores.

In the case that the powder detergent granules use a combination of materials as the alkali builder, not one kind of material, as contents of sodium bicarbonate and sodium sulfate increase, the density of powder detergent granules tends to increase, and therefore, the content of sodium bicarbonate and sodium sulfate should be properly controlled. And, kind and content of the alkali builder are selected in consideration of performance of the powder detergent granules, for example a protein soil removing capability (as pH of the powder detergent reduces, the protein soil removing effect increases) and an inorganic soil removing capability, and easiness of manufacturing the powder detergent granules (for example, the sodium carbonate makes it easy to manufacture the powder detergent granules). In particular, the sodium bicarbonate serves as a pH control agent to buffer a pH of water, but has high specific gravity and weak alkali property, and therefore exhibits lower performance for inducing a neutralization reaction than other kind of alkali builder.

And, the powder detergent granules of the present invention may optionally comprise 1 to 30 parts by weight of an organic acid. The organic acid supplements the acid strength of the above-mentioned acidic water-soluble polymer. The organic acid acts as an acid component in a neutralization reaction to cause pores to a powder detergent, reduce the density of the powder detergent granules, and improve the washing capability itself of the powder detergent granules. The organic acid may be a general solid phase organic acid or liquid phase organic acid, but preferably the organic acid is a solid phase organic acid such as a derivative of a carboxylic acid, for example a citric acid, a succinic acid, a tartaric acid and a malic acid. The organic acid should be selected in consideration of easiness of manufacturing low-density powder detergent granules and product performance such as smell on use.

Preferably, the organic acid of the present invention has 0.01 to 2 mm of granule size in consideration of effectiveness of the above-mentioned neutralization reaction.

And, the powder detergent granules of the present invention may further comprise 1 to 30 parts by weight of an anionic surfactant. The anionic surfactant performs a washing function, i.e. a unique function of the powder detergent granules, and in the powder detergent granules of the present invention, the anionic surfactant acts as an acid component together with the above-mentioned acidic water-soluble polymer (or the acidic water-soluble polymer and the organic acid) to cause pores to a powder detergent, thereby manufacturing the powder detergent granules.

The anionic surfactant may be a general anionic surfactant used in a laundry detergent composition. Specifically, the anionic surfactant may be lauryl benzene sulfonic acid, alpha-olefin sulfonate, sodium lauryl sulfate, sodium lauryl ethoxylated sulfate, or combinations thereof. Preferably, the anionic surfactant may be lauryl benzene sulfonic acid having good physical properties and good liability to low density. The content of anionic surfactant may be controlled within the above-mentioned range according to a desired density of powder detergent granules.

And, the powder detergent granules of the present invention may further comprise 1 to 30 parts by weight of a nonionic surfactant. Generally, the nonionic surfactant is liquid, and thus the whole content of the nonionic surfactant affects the density of the powder detergent granules. In the case that the content of nonionic surfactant is high, easiness of manufacturing the powder detergent granules is lowered, and in the case that the content of the nonionic surfactant is low, washing performance of the powder detergent granules is reduced, and thus preferably the content of the nonionic surfactant is 1 to 30 parts by weight. As the powder detergent granules of the present invention have a lot of pores, the powder detergent granules can accommodate a considerable amount of liquid nonionic surfactant.

In other words, the powder detergent granules of the present invention are substantially free of zeolite or silica that absorbs a liquid component, but are capable of accommodating a considerable amount of liquid nonionic surfactant. Thus, the present invention provides powder detergent granules that are substantially free of a water-insoluble component and comprise a nonionic surfactant of 1 weight % or more, preferably above 5 weight % or more, in a different way from the conventional powder detergent granules.

The nonionic surfactant is a general nonionic surfactant used in a laundry detergent composition, for example polyoxyethylene alkyl ether, coconut diethanolamide, fatty acid alkanolamine, amine oxide, alkyl polyglucoside, methyl polyethylene alkyl ether and sugar ether.

And, the powder detergent granules of the present invention may further comprise 0.3 to 10 parts by weight of various additives within the range of not destroying the objects of the present invention. The additives may include a protein degrading enzyme (protease) for removing a protein soil, a lipid degrading enzyme (lipase) for removing a lipid soil, a carbohydrate degrading enzyme (amylase) for removing a food soil, a cellulose degrading enzyme (cellulase) for removing lint of a cotton fabric, a fluorescent dye such as biphenyl and stilbene species, and a dye transfer inhibitor for inhibiting a dye of a fabric from transferring to another fabric or inhibiting the separated soil from redeposition with a fabric.

Preferably, the powder detergent granules of the present invention comprise 0.01 to 1 parts by weight of a protein degrading enzyme, 0.01 to 1 parts by weight of a lipid degrading enzyme, 0.01 to 1 parts by weight of a carbohydrate degrading enzyme and 0.01 to 1 parts by weight of a cellulose degrading enzyme, 0.1 to 1 parts by weight of a fluorescent dye, and 0.5 to 5 parts by weight of a dye transfer inhibitor.

And, according to the present invention, a method for manufacturing powder detergent granules that are dried by heat generated from a neutralization reaction between an acidic water-soluble polymer and an alkali builder, comprises (S1) preparing an acidic water-soluble polymer and an alkali builder; (S2) putting 0.1 to 15 parts by weight of the acidic water-soluble polymer and 10 to 70 parts by weight of the alkali builder into a mixer; and (S3) uniformly mixing the components of the step (S2) put into the mixer.

According to the present invention, when the acidic water-soluble polymer and the alkali builder putted into the mixer are uniformly mixed with the above-mentioned mixture ratio, the acidic water-soluble polymer and the alkali builder bring about a neutralization reaction to manufacture powder detergent granules. The resultant moisture is naturally dried by heat generated in the neutralization reaction. The above-mentioned anionic surfactant and nonionic surfactant components may be added according to purpose and function of the powder detergent granules.

Therefore, in a different way from a conventional method for manufacturing powder detergent granules, the method of the present invention may eliminate the need of a heating step for drying the powder detergent granules or considerably reduce a heating procedure, thereby resulting in a simple and economical method, and the powder detergent granules manufactured by such a method are substantially free of a water-insoluble component, and thus have good solubility and washing performance in cold water, leave no residue in laundry and reduce the likelihood of a caking phenomenon during manufacture and storage.

Hereinafter, preferred embodiments are provided to describe the present invention in detail. It should be understood that the detailed description and specific examples are given by way of illustration only, since various changes and modifications within the spirit and scope of the invention will become apparent to those skilled in the art from this detailed description.

Manufacture and Evaluation of Acidic Water-Soluble Polymer

An acrylic acid monomer unit and 2-acrylamido-2-methylpropane sulfonic acid monomer unit were mixed with a weight ratio of 9:1, and polymerized in water using a persulfate initiator to manufacture a random copolymer. The manufactured copolymer has a molecular weight of 6,000 to 15,000, and evaluation of other physical properties is shown in the following Table 1. The copolymer was used in the following embodiment.

TABLE 1

| | Unit | Spec. | Allowance | Test Method | |
|---|---|---|---|---|---|
| Appearance | | Clear | | | Sensory Test |
| Solid content | Wt. % | 50 | ±1.0 | KSM3704 | 105° C., 3 hrs |
| pH | | 1 | ±0.5 | KSM0011 | pH meter, an undiluted solution |
| Viscosity (25° C.) | cP | 1000 | ±500 | KSM3825 | #B Viscometer RVT (#3/50) |
| Odor | | Slightly acidic | | | Sensory Test |

Manufacture of Examples 1-2 and Comparison Examples 1-2

The examples and comparison examples were manufactured by mixing raw materials using a high-speed mixer according to components and content as represented in the following Table 2. Specifically, the examples and comparison examples were manufactured in such a typical method that raw materials other than additives are mixed to manufacture powder detergent granules and then additives are added.

TABLE 2

| Ingredient (parts by weight) | | Example 1 | Example 2 | Comparison example 1 | Comparison example 2 |
|---|---|---|---|---|---|
| Nonionic surfactant | Polyoxyethylene alkyl ether | 6 | 5 | 6 | 5 |
| Anionic surfactant | Lauryl benzene sulfonic acid | 10 | 15 | 10 | 15 |
| Acidic water-soluble polymer | Polyacrylic acid | 3 | — | — | — |
| | Copolymer of acrylic acid & 2-acrylamido-2-methylpropane sulfonic acid | — | 3 | — | — |
| Alkali builder | Sodium carbonate | 45 | 50 | 40 | 45 |
| | Sodium sulfate | 20 | 15 | 23 | 28 |
| Softener | Zeolite 4A | — | — | 5 | 15 |
| Additives | Fluorescent whitening agent | | | 0.15 | |
| | Protein degrading enzyme | | | 0.2 | |
| | Cellulose degrading enzyme | | | 0.3 | |
| | Carbohydrate degrading enzyme | | | 0.2 | |
| | Aromatic | | | 0.2 | |

In the above Table 2, the fluorescent whitening agent was Tinopal CBS-X (Ciba Special Chem. FMC.), the protein degrading enzyme was Savinase 12.0T (Novozymes), the cellulose degrading enzyme was Carezyme 900T (Novozymes), and the carbohydrate degrading enzyme was Termamyl 120T (Novozymes).

Evaluation of Caking Phenomenon

The influence of the powder detergent granules of the examples and the comparison examples on a caking phenomenon was observed with the naked eye and judged according to the following standard for judgment. The judgment results are shown in the following Table 3.

[Standard for Judgment]

Good: detergent granules are not caked and granule mobility is good.

Normal: detergent granules are not caked, but a little wet.

Inadequate: detergent granules are a little wet and caked with small sizes in places.

Poor: detergent granules are wet and caked.

TABLE 3

| Measurement | Example 1 | Example 2 | Comparison example 1 | Comparison example 2 |
|---|---|---|---|---|
| Caking phenomenon prevention | Normal | Good | Poor | Inadequate |

As shown in the above Table 3, there was a remarkable difference in a caking phenomenon between the examples and the comparison examples, and the example 2 using a copolymer of acrylic acid and 2-acrylamido-2-methylpropane sulfonic acid as an acidic water-soluble polymer had better granule condition than the example 1 using a polyacrylic acid polymer as an acidic water-soluble polymer. And, both of the examples 1 and 2 did not comprise a water-insoluble component, zeolite, but had better caking phenomenon preventing capability than the comparison examples. According to the results, the powder detergent granules having the component and content described in the present invention can be manufactured properly by a neutralization reaction without use of zeolite.

Evaluation of Washing Performance

The washing performance, i.e. a stain removal performance of the powder detergent granules was evaluated. The washing performance was evaluated using a washing machine of the same condition and a general city water. The washing temperature was a temperature of cold water for the same condition as a common domestic use. A soiled fabric used for evaluation of washing performance was a fabric prepared artificially with wet soil according to Japan laundry science association, and washing performance was evaluated in a statistical manner by comparing twenty pieces of soiled fabrics having 5×5 cm size. WB values, i.e. whiteness of the soiled fabrics were measured before and after laundry using a color difference meter. Each of 30 g powder detergent granules of the examples and the comparison examples was put into the washing machine, and the soiled fabric was attached to a real cotton shirt. The washing machine was operated in a standard course to wash and spin dry the soiled fabrics, the soiled fabrics were dried in a thermo-hygrostat (25° C., 20% RH) for one day and ironed, and WB values were measured using the same color difference meter. The WB values were substituted for Kubelka-Munk equation represented by the following Equation 1 to calculate the washing performance, and the calculation results are shown in the following Table 4.

$$WashingCapability(\%) = \frac{[(1-R_s^2)/2R_s - (1-R_c^2)/2R_c]}{[(1-R_s^2)/2R_s - (1-R_0^2)/2R_0]} \times 100 \quad \text{Math FIG. 1}$$

where Rs is a surface reflection ratio of the soiled fabric, Rc is a surface reflection ratio of the cotton fabric after stain removal, and Ro is a surface reflection ratio of a white cotton fabric.

TABLE 4

| Classification | Example 1 | Example 2 | Comparison example 1 | Comparison example 2 |
|---|---|---|---|---|
| Washing performance (%) (Japan laundry science association soiled fabric) | 66.87 | 68.23 | 63.21 | 64.84 |

As shown in the Table 4, as compared with the powder detergent granules of the comparison examples 1 and 2, the powder detergent granules of the examples 1 and 2 showed higher washing performance, and it is judged that improvement of washing performance was resulted from a soil antiredeposition function and a water softening effect of the acidic water-soluble polymer. And, the powder detergent granules of the present invention were free of a water-insoluble component, and thus the powder detergent granules were all dissolved and a detergent residue was not left. This leads to improved washing performance. However, the powder detergent granules of the comparison examples 1 and 2 were not completely dissolved, and thus it is judged that the powder detergent granules of the comparison examples 1 and 2 have lower washing performance than the powder detergent granules of the examples 1 and 2.

INDUSTRIAL APPLICABILITY

As such, the powder detergent granules according to the present invention have good caking phenomenon preventing and washing performances, and are substantially free of a water-insoluble component, and thus have good solubility and do not leave residue in laundry. And, the powder detergent granules of the present invention are substantially free of zeolite or silica that absorbs a liquid component, but are capable of accommodating a considerable amount of liquid surfactant. The acidic water-soluble polymer of the present invention is useful as a detergent component in various aspects.

The invention claimed is:
1. Detergent granules, comprising:
   1 to 30 parts by weight of nonionic surfactant;
   15 to 30 parts by weight of anionic surfactant comprising lauryl benzene sulfonic acid;
   3 to 15 parts by weight of a copolymer of acrylic acid and 2-acrylamido-2-methylpropane sulfonic acid, wherein a weight ratio of acrylic acid to 2-acrylamido-2-methylpropane sulfonic acid is 95:5 to 80:20; and
   50 to 70 parts by weight of an alkali builder comprising sodium carbonate and sodium sulfate,
   wherein the detergent granules have pores created by moisture and gas of a neutralization reaction between the copolymer and the anionic surfactant as acidic components and the alkali builder as a base component, and are dried by heat generated by the neutralization reaction, and wherein the detergent granules are free of zeolite or silica that absorbs liquid components.

2. The powder detergent granules according to claim 1, wherein the alkali builder further comprises at least one of sodium bicarbonate and sodium hydroxide.

3. The powder detergent granules according to claim 1, wherein the anionic surfactant further comprises at least one of alpha-olefin sulfonate, sodium lauryl sulfate and sodium lauryl ethoxylated sulfate.

4. The detergent granules according to claim 1, wherein a pH of the copolymer is 0.1 to 3 when measured as 50% aqueous solution.

5. The detergent granules according to claim 1, wherein a viscosity of the copolymer is 300 to 2000 cP at 25° C.

6. The detergent granules according to claim 1, wherein the copolymer has an average molecular weight of 2,000 to 100,000.

7. The detergent granules according to claim 1, wherein the nonionic surfactant is a liquid.

8. The detergent granules according to claim 7, wherein the nonionic surfactant liquid is 5 weight % or more based on the total weight of the detergent granules.

9. The detergent granules according to claim 1, wherein the nonionic surfactant comprises at least one of polyoxyethylene alkyl ether, coconut diethanolamide, fatty acid alkanolamine, amine oxide, alkyl polyglucoside, methyl polyethylene alkyl ether, and sugar ether.

10. The detergent granules according to claim 1, wherein the nonionic surfactant is polyoxyethylene alkyl ether.

11. The detergent granules according to claim 1, wherein the detergent granules further comprise 1 to 30 parts by weight of an organic acid.

12. The detergent granules according to claim 11, wherein the organic acid is a solid phase organic acid comprising at least one of a derivative of a carboxylic acid, a succinic acid, a tartaric acid, and a malic acid.

13. The detergent granules according to claim 11, wherein the organic acid is a solid phase organic acid having a granule size of 0.01 to 2 mm.

14. The detergent granules according to claim 1, further comprising 0.3 to 10 parts by weight of at least one additive selected from the group consisting of a protein degrading enzyme, a lipid degrading enzyme, a carbohydrate degrading enzyme, a cellulose degrading enzyme, a fluorescent dye, and a dye transfer inhibitor.

15. The detergent granules according to claim 1, further comprising at least one of 0.01 to 1 parts by weight of a protein degrading enzyme, 0.01 to 1 parts by weight of a lipid degrading enzyme, 0.01 to 1 parts by weight of a carbohydrate degrading enzyme, 0.01 to 1 parts by weight of a cellulose degrading enzyme, 0.1 to 1 parts by weight of a fluorescent dye, and 0.5 to 5 parts by weight of a dye transfer inhibitor.

16. The detergent granules according to claim 1, wherein the copolymer is a random copolymer, an alternating copolymer, a block copolymer, or a graft copolymer.

17. The detergent granules according to claim 1, wherein the copolymer is a random copolymer.

18. The detergent granules according to claim 1, wherein the weight ratio of acrylic acid to 2-acrylamido-2-methylpropane sulfonic acid is 95:5 to 90:10.

19. The detergent granules according to claim 1, wherein the weight ratio of acrylic acid to 2-acrylamido-2-methylpropane sulfonic acid is 90:10.

20. The detergent granules according to claim 1, wherein the copolymer has an average molecular weight of 6,000 to 15,000.

* * * * *